US011888898B2

(12) United States Patent
Lear et al.

(10) Patent No.: US 11,888,898 B2
(45) Date of Patent: Jan. 30, 2024

(54) NETWORK CONFIGURATION SECURITY USING ENCRYPTED TRANSPORT

(71) Applicant: Cisco Technology, Inc., San Jose, CA (US)

(72) Inventors: Eliot Lear, Wetzikon (CH); Einar Nilsen-Nygaard, East Ayrshire (GB)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/463,751

(22) Filed: Sep. 1, 2021

(65) Prior Publication Data

US 2022/0210192 A1 Jun. 30, 2022

Related U.S. Application Data

(60) Provisional application No. 63/132,795, filed on Dec. 31, 2020.

(51) Int. Cl.
*H04L 9/40* (2022.01)
*H04L 61/5014* (2022.01)

(52) U.S. Cl.
CPC ........ *H04L 63/166* (2013.01); *H04L 61/5014* (2022.05); *H04L 63/0869* (2013.01); *H04L 63/0884* (2013.01)

(58) Field of Classification Search
CPC ............... H04L 63/166; H04L 61/5014; H04L 63/0869; H04L 63/0884; H04L 61/503
See application file for complete search history.

(56) References Cited

U.S. PATENT DOCUMENTS

| 8,285,990 | B2 | 10/2012 | Nakhjiri | |
|---|---|---|---|---|
| 2005/0105529 | A1* | 5/2005 | Arberg | H04L 61/5014 370/395.5 |
| 2005/0286518 | A1* | 12/2005 | Park | H04L 61/5014 370/389 |
| 2006/0075123 | A1* | 4/2006 | Burr | H04L 61/35 709/228 |
| 2007/0203999 | A1 | 8/2007 | Townsley et al. | |
| 2007/0230415 | A1* | 10/2007 | Malik | H04W 28/18 370/338 |
| 2010/0037054 | A1 | 2/2010 | Zhao | |

(Continued)

FOREIGN PATENT DOCUMENTS

CN 102231725 A 11/2011
WO WO2015035921 A1 3/2015

OTHER PUBLICATIONS

E. Lear, R. Droms, D. Romascanu, RFC 8520 Manufacturer Usage Description Specification, Mar. 2019, IETF (Year: 2019).*

*Primary Examiner* — Amie C. Lin
(74) *Attorney, Agent, or Firm* — Lee & Hayes, P.C.

(57) ABSTRACT

At an authentication server, a request for at least a first dynamic host configuration protocol (DHCP) option is received from a client device, and it is determined if the authentication server implements DHCP. Based at least in part on a determination that the authentication server does not implement a DHCP, the operations further include transmitting an application program interface (API) call to a DHCP server associated with the authentication server acting as a DHCP gateway, receiving a response from the DHCP server, and transmitting the response to the client device.

20 Claims, 7 Drawing Sheets

(56) References Cited

U.S. PATENT DOCUMENTS

| | | | |
|---|---|---|---|
| 2015/0016416 A1* | 1/2015 | Hawkes | H04W 8/26 370/331 |
| 2019/0306166 A1* | 10/2019 | Konda | H04W 12/069 |
| 2022/0006805 A1* | 1/2022 | Kulkarni | H04L 67/10 |

* cited by examiner

NETWORK CONFIGURATION SECURITY
USING ENCRYPTED TRANSPORT

RELATED APPLICATIONS

This Application claims priority to U.S. provisional patent application No. 63/132,795, filed Dec. 31, 2020, which is incorporated herein by reference.

TECHNICAL FIELD

The present disclosure relates generally to securing network configurations. Specifically, the present disclosure relates to a system to encrypt previously unencrypted dynamic host configuration protocol (DHCP) options by serializing a Dynamic Host Configuration Protocol (DHCP) version 6 (DHCPv6) YANG model into either extensible markup language (XML), JavaScript object notation (JSON), or concise (or compact) binary object representation (CBOR), and applying a representational state transfer (REST) wrapper.

BACKGROUND

Dynamic host configuration protocol (DHCP) is a network management protocol used on Internet Protocol (IP) networks for automatically assigning IP addresses and other communication parameters to devices connected to a network using a client-server architecture. Computing devices and systems may, in some instances, leak identifying information via the DHCP since other entities associated with the computing devices and systems may be able to view data packets transmitted to other computing devices. For example, depending on underlying layer 2 (L2) technologies used within the computing devices and systems, this information may be made visible to anyone in promiscuous mode. Promiscuous mode may be defined as any mode for a wired network interface controller (NIC) or wireless network interface controller (WNIC) that causes the controller to pass all traffic it receives to a central processing unit (CPU) rather than passing only the frames that the controller is specifically programmed to receive. This mode may be used for packet sniffing that takes place on a router or on a computer connected to a wired network or that is part of a wireless LAN. For example, interfaces may be placed into promiscuous mode by software bridges that may be used with hardware virtualization. In light of the above, initial messages sent by the computing device or system may be particularly vulnerable to leakage. Initial messages that include options that are broadcast such as DHCP options, device options, or configuration options will leak. In these scenarios, even unicast messages that are available across a shared medium may also be seen and subject to security leaks.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Figure 1:
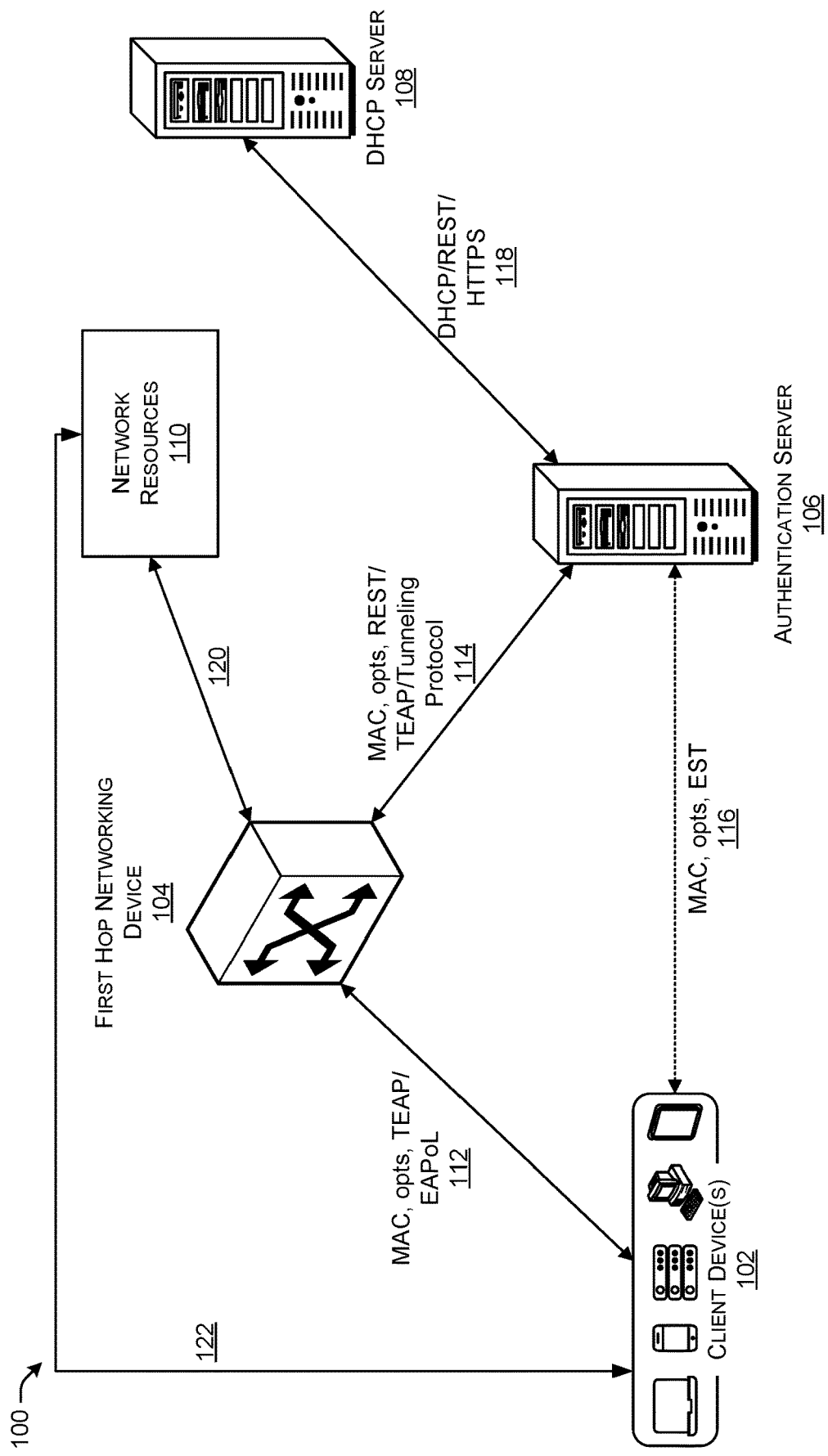
FIG. 1 illustrates a system-architecture diagram of a network that utilizes secure network configuration via encrypted transmission, according to an example of the principles described herein.

The present systems and methods relate to encrypting previously unencrypted Dynamic Host Configuration Protocol (DHCP) options by serializing a DHCPv6 YANG model into either JavaScript Object Notation (JSON), Concise Binary Object Representation (CBOR), or Extensible Markup Language (XML) and applying an API protocol wrapper (e.g., a Representational State Transfer (REST) wrapper) which reduces the ability of an attacker to fingerprint a device while maintaining visibility to authorized clients.

Overview

Examples described herein provide a non-transitory computer-readable medium storing instructions that, when executed, causes a processor to perform operations, including, at an authentication server, receiving, from a client device, a request for at least a first dynamic host configuration protocol (DHCP) option, and determining if the authentication server implements DHCP. Based at least in part on a determination that the authentication server does not implement a DHCP, the operations further include transmitting an application program interface (API) call to a DHCP server associated with the authentication server acting as a DHCP gateway, receiving a response from the DHCP server, and transmitting the response to the client device.

The operations further include, based at least in part on the authentication server does implement DHCP protocol, transmitting to the client device a response from the authentication server. The response includes the at least first DHCP option, and at least a second DHCP option, the at least second DHCP option being a non-requested option with respect to the at least first DHCP option. The at least first DHCP option includes a first plurality of DHCP options. The at least second DHCP option comprises a second plurality of DHCP options, the second plurality of DHCP options including non-requested options with respect to the first plurality of DHCP options.

The operations further include performing a bidirectional authentication with an authentication server. The request for the at least first DHCP option may be sent via extensible authentication protocol (EAP) through a first hop networking device. The request for the at least first DHCP option may be sent directly to the authentication server via enrollment over secure transport (EST). The request for the at least first DHCP option may be sent directly to the authentication server via EST to reauthenticate the client device.

Examples described herein also provide a method includes, at an authentication server, receiving, from a client device, a request for at least a first dynamic host configuration protocol (DHCP) option, and determining if the authentication server implements DHCP. Based at least in part on the authentication server does not implement a DHCP protocol, an application program interface (API) call may be transmitted to a DHCP server associated with the authentication server as a DHCP gateway. A response from the DHCP server may be received, and the response may be transmitted to the client device.

The method further includes, based at least in part on the authentication server does implement DHCP protocol, transmitting to the client device a response from the authentication server. The response includes the at least first DHCP option, and at least a second DHCP option, the at least second DHCP option being a non-requested option with respect to the at least first DHCP option.

The at least first DHCP option comprises a first plurality of DHCP options. The at least second DHCP option includes a second plurality of DHCP options, and the second plurality of DHCP options include non-requested options with respect to the first plurality of DHCP options. The request for the at least first DHCP option may be sent via extensible authentication protocol (EAP) through a first hop networking device. The request for the at least first DHCP option may be sent directly to the authentication server via enrollment over secure transport (EST). The request for the at least first DHCP option may be sent directly to the authentication server via EST to reauthenticate the client device.

Examples described herein also provide an authentication server including a processor, and a non-transitory computer-readable media storing instructions that, when executed by the processor, causes the processor to perform operations including receiving, from a client device, a request for at least a first dynamic host configuration protocol (DHCP) option, and determining if the authentication server implements DHCP. The operations further include, based at least in part on the authentication server does not implement a DHCP protocol, transmitting an application program interface (API) call to a DHCP server associated with the authentication server as a DHCP gateway, and receiving a response from the DHCP server. Based at least in part on the authentication server does implement DHCP protocol, the operations include transmitting to the client device a response from the authentication server. The response includes the at least first DHCP option, and at least a second DHCP option, the at least second DHCP option being a non-requested option with respect to the at least first DHCP option.

The request for the at least first DHCP option may be sent via extensible authentication protocol (EAP) through a first hop networking device. The request for the at least first DHCP option may be sent directly to the authentication server via enrollment over secure transport (EST). The request for the at least first DHCP option may be sent directly to the authentication server via EST to reauthenticate the client device.

Additionally, the techniques described in this disclosure may be performed as a method and/or by a system having non-transitory computer-readable media storing computer-executable instructions that, when executed by one or more processors, performs the techniques described above.

Example Embodiments

As described above, DHCP is an unencrypted network management protocol technology. Initial messages, for example, that include options that are broadcast such as DHCP options, device options, and/or configuration options may leak or otherwise be exposed to third party inspection.

An application programming interface (API) is a type of software interface used as a connection between computer programs within a network. In contrast to a user interface that connects a computer to a person, an API connects computers or pieces of software to each other and is not intended to be used directly by a person other than a computer programmer who is incorporating it into software. An API is often made up of different parts which act as tools or services that are available to the programmer. A program or a programmer that uses one of these parts is said to "call" that portion of the API. The calls that make up the API are also known as subroutines, methods, requests, or endpoints. An API specification defines these calls, meaning that it explains how to use or implement them. APIs may be used in order to hide the internal details of how a system works, exposing only those parts a programmer will find useful and keeping these parts consistent even if the internal details later change. The API may include a web API that allows communication between computers that are joined by the Internet, APIs for programming languages, APIS for software libraries, APIs for computer operating systems, and APIs for computer hardware, among other types of APIs. In one example, an API call may be made to a DHCP server over a network. An example of protocols used to communicate API calls (or requests) and responses may include Hypertext Transfer Protocol (HTTP), Hypertext Transfer Protocol Secure (HTTPS), or other protocol. However, API calls have not been used for transport of the above-mentioned types of options (e.g., DHCP options, device options, and/or configuration options).

Extensible authentication protocol (EAP) (described in, for example, RFC 7030) is an authentication framework frequently used in network and internet connections. Each protocol that uses EAP defines a way to encapsulate by the user EAP messages within that protocol's messages. Further, EAP may be used in in IEEE 802.11 (WiFi) communications where the WiFi protected access (WPA) standards (e.g., WPA, WPA2, WPA3, etc.) have adopted IEEE 802.1X (with various EAP types) as the canonical authentication mechanism. However, EAP does not provide a means to transport the above-mentioned types of options (e.g., DHCP options, device options, and/or configuration options).

Transport layer security (TLS) (described in Request for Comments (RFC) 5246, the entirety of which is incorporated herein by reference) is a cryptographic protocol designed to provide communications security over a computer network, is widely used in applications such as email, instant messaging, and voice over IP (VoIP), and is especially used as the security layer in HTTPS. TLS runs in the application layer (e.g., L7) of the Internet. The TLS protocol may be used on client-server applications to communicate across a network in a way designed to prevent eavesdropping and tampering and provide security to data packets transmitted between a client device and a DHCP server, authentication server, and/or any intermediate computing devices.

Tunnel extensible authentication protocol (TEAP) (described in RFC 7170, the entirety of which is incorporated herein by reference) is a tunnel-based Extensible Authentication Protocol (EAP) method that establishes a secure tunnel and executes other EAP methods under the protection of that secured tunnel. TEAP authentication occurs in two phases after the initial EAP Identity request/response exchange. In the first phase, TEAP uses the transport layer security (TLS) handshake to provide an authenticated key exchange and to establish a protected tunnel. Once the tunnel is established, the second phase begins with the computing device and the server engaging for further conversation to establish the required authentications and authorization policies. TEAP, however, is not configured to transport the above-mentioned types of options (e.g., DHCP options, device options, and/or configuration options). TEAP enables secure communication between a peer and a server by using the TLS protocol to establish a mutually authenticated tunnel. The type-length-value (TLV) objects are used within the TEAP tunnel to transport authentication-related data between the EAP peer and the EAP server. TEAP is used as part of an initial association of a computing device to a network. For example, when the computing device is communicatively coupled to a switch or begins a WiFi connection, TEAP may be used to authenticate the computing device, identifying the computing device within the network, and ensuring that the computing device is allowed to connect to the network. TEAP also allows for the chaining of additional operations to the end of the initial association and authentication of the computing device with the network. TEAP may utilize a tunnel to access an authentication server that utilizes authentication protocols such as the Identity Services Engine (ISE) authentication protocols developed and distributed by Cisco Systems, Inc. The authentication server may validate credentials sent via TEAP from the computing device. As will be described in more detail below, the present systems and methods utilize TEAP to access additional information from an authentication server and/or a DHCP server such as, for example, an address allocation. In this manner, a computing device may obtain an IP address the computing device is authorized to receive. In the examples described herein, the interactions between the computing device and the authentication server are fully encrypted, private, and secure. Once authenticated through the authentication server is achieved and an IP address is allocated to the computing device, the computing device may establish other connections within the network using IP. These other connections may include connections to mail servers, web servers, and other network resources.

The yet another next generation (YANG) data model is a logical definition of information a user desires to exchange. YANG is a data modeling language for the definition of data sent over network management protocols (e.g., the extensible markup language (XML)-based network configuration (NETCONF) protocol and the hypertext transfer protocol (HTTP)-based Representational State Transfer Configuration Protocol (RESTCONF)). Further, the YANG model may be used to model both configuration data as well as state data of network elements. Furthermore, the YANG model may be used to define the format of event notifications emitted by network elements and it allows data modelers to define the signature of remote procedure calls that can be invoked on network elements via the NETCONF protocol. The language associated with the YANG model is protocol independent and may be converted into any encoding format, such as, for example, XML, JSON, or CBOR that the network configuration protocol supports. The YANG model is a modular language representing data structures in an XML tree format and includes a number of built-in data types. As described at https://tools.ietf.org/html/draft-ietf-dhc-dhcpv6-yang-15, YANG data models may be used to configure and manage DHCPv6 servers, relays, and clients, and provides a means to serialize DHCP options into XML, JSON, or CBOR. However, the YANG model does not provide a mechanism to transmit the options described above (e.g., DHCP options, device options, and/or configuration options).

The above data models are approved and accepted by the Internet Engineering Task Force (IETF) and are accepted by computer networking communities around the world. Thus, because these standards are so ubiquitously accepted, the present systems and methods do not seek to change these standards, but do seek to exchange data between an endpoint (e.g., a computing device) and an actor such as an authentication server and/or a DHCP server in a secure manner.

In light of the above and turning now to the figures, FIG. 1 illustrates a system-architecture diagram of a network 100 that utilizes secure network configuration via encrypted transmission, according to an example of the principles described herein. The network 100 of FIG. 1 encrypts DHCP options in order to avoid leakage of the DHCP options that may compromise the security of the computing devices within the network 100. The network 100 may include a number of network device(s) 102. The client device 102 may include, for example, a personal computer, a workstation, a desktop computer, a laptop, mobile computing devices, a tablet, a network appliance, an e-reader, a smartphone, wearable computers (e.g., smart watches, optical head-mounted displays (OHMDs), etc.) or other computing devices. The client devices 102 may also include, for example, relays, repeaters, routers, switches, encoder/receiver/transmitters (ERTs), appliances, servers, and access points, and gateway computing devices, among others.

The network may further include an authentication server 106. In one example, the authentication server 106 may be an identity services engine (ISE) authentication server developed and distributed by Cisco Systems, Inc. The authentication server may be any computing device including a server computing device that provides a network service that applications may use to authenticate credentials (e.g., account names and passwords) of their users. When the client device 102 submits a valid set of credentials, the client device 102 receives from the authentication server 106 a cryptographic ticket that it can subsequently use to access various services. Authentication is used as the basis for authorization, which is the determination whether a privilege may be granted to a particular user or process, privacy, which keeps information from becoming known to non-participants, and non-repudiation, which is the inability to deny having done something that was authorized to be done based on the authentication.

In one example, a number of intermediary devices may be included between the client device 102 and the authentication server 106. As depicted in FIG. 1, a first hop networking device 104 may communicatively couple the client device 102 and the authentication server 106 even though, in one example described herein, the client device 102 may communicate directly with the authentication server 106. The first hop device 104 may include, for example, relays, repeaters, routers, switches, encoder/receiver/transmitters (ERTs), appliances, servers, and access points, and gateway computing devices, among other computing devices. As will be described in more detail below, the first hop networking device 104 may be used when communicating with the authentication server 106 using TEAP or EAP.

The authentication server 106 may be communicatively coupled to a DHCP server 108. In the examples described herein, although one DHCP server 108 is depicted in the figures, any number of DHCP servers may be included within the network 100. In examples where a plurality of DHCP servers 108 are included within the network 100, the authentication server 106 may determine which of the plurality of DHCP servers to utilize based on the parameters requested by the client device 102 and/or a client identification of the client device 102. A request to the authentication server 106 for options from a first client device 102 partitioned on a first network based on the authentication of the first client device 102 may cause the authentication server 106 to identify a first DHCP server 108 of the plurality of DHCP servers 108 to which the request is to be sent. Similarly, a request to the authentication server 106 for options from a second client device 102 partitioned on a second network based on the authentication of the second client device 102 may cause the authentication server 106 to identify a second DHCP server 108 of the plurality of DHCP servers 108 to which the request is to be sent. For example, the first client device may be associated with a classified network among a number of both classified and unclassified networks that include printing devices, and an administrator seeks to ensure that a print command from the first client device 102 prints to the correct or appropriate printing device. In this example, the authentication server 106 may determine which of the classified or unclassified networks and their associated DHCP server to utilize based on the parameters requested by the client device 102 and/or a client identification of the client device 102 and the authentication server may the first client device with the correct and/or appropriate options for that specific DHCP server 108 associated with the correct and/or appropriate network.

DHCP eliminates the need for individually configuring network devices manually, and consists of two network components, a centrally installed network DHCP server 108 and client instances of the protocol stack on each client device 102 within the network 100. When connected to the network 100, and periodically thereafter, the client device 102 may request a set of parameters from the DHCP server 108 using the DHCP protocol and may do so via the authentication server 106. In one example, the DHCP server 108 is only necessary if the authentication server 106 (utilizing ISE authentication protocols) does not implement the functionality. The API call (e.g., a RESTful call) to the DHCP server is only required as a transitionary phase for example. If the authentication server 106 does not implement DHCP, the authentication server 106 may then make a RESTful request to the DHCP server 108 as a DHCP gateway would make such a request. The response is then relayed back through the authentication server 106 as will be described in more detail below.

A number of network resources 100 may be made available to the client device 102 once authentication and configuration has taken place. The computing device 102 may establish other connections within the network using IP. These other connections may include connections to mail servers, web servers, and other network resources 110.

The examples described herein utilize API calls. These API calls provide interoperability between computer systems on the network 100 (e.g., Internet), and allow the requesting systems (e.g., the client device 102) to access and manipulate textual representations of Web resources by using a uniform and predefined set of stateless operations.

The API calls may serve as HTTP requests that includes requests for actions to be performed and/or information to be provided. The client device 102 may utilize API calls to the DHCP server 108 over the network. In one example, the API calls may be made via HTTP, hypertext transfer protocol secure (HTTPS), or other type of protocol.

In one example, the client device 102 may be securely configured and authenticated as to the network 100 by utilizing TEAP or EAP. Because TEAP is encrypted, any DHCP options transmitted between the client device 102, the authentication server 106, and/or the DHCP server 108 are also encrypted. In one example, EAP methods may alternatively be used to provide encryption and a lock step extension mechanism to implement the systems ad methods described herein.

Figure 3:
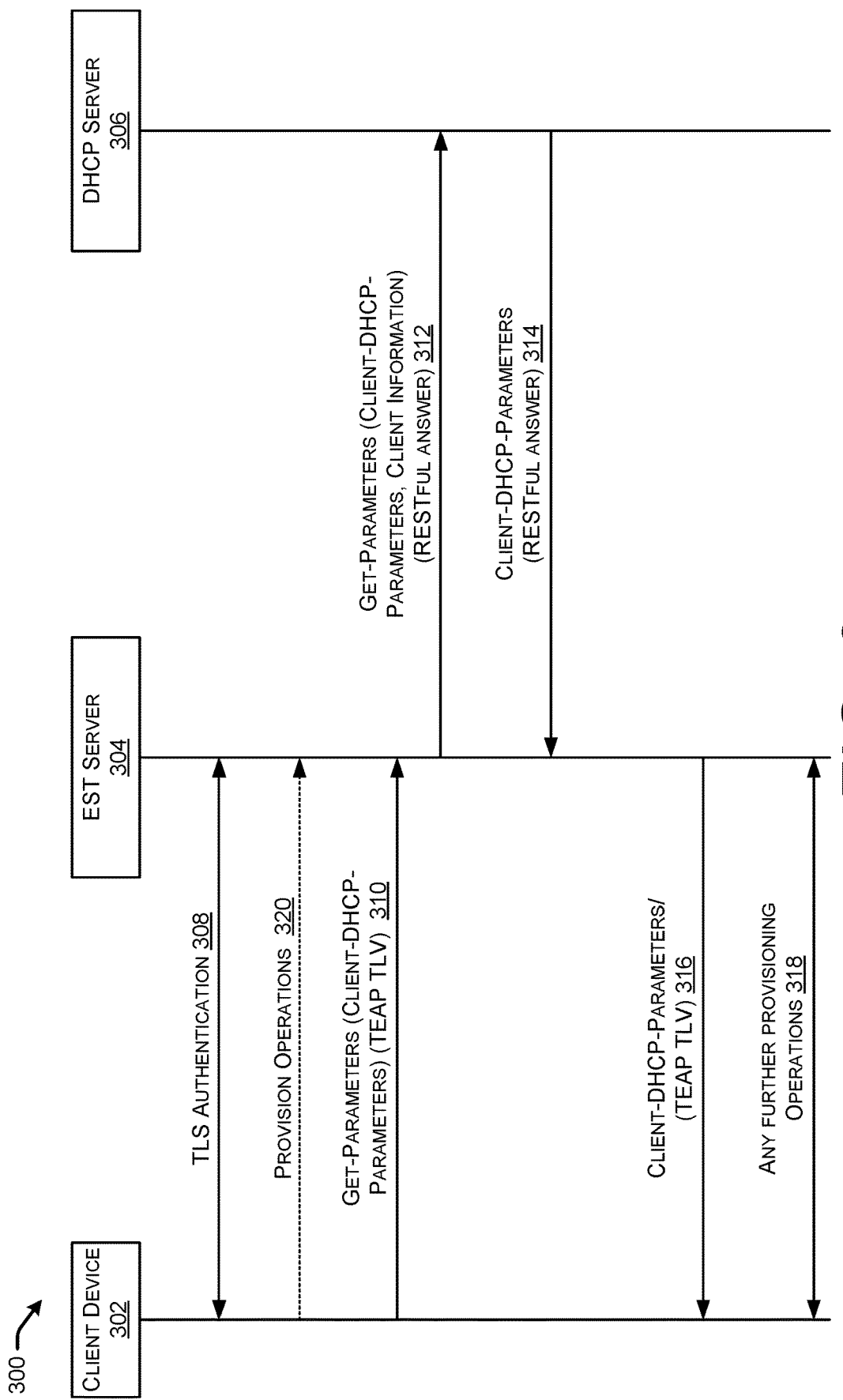
FIG. 3 illustrates a call flow diagram of a secure network configuration, according to an example of the principles described herein.

Further, in one example, the DHCP server 108 may provide an IP and network address as well as a new option that provides a pointer to an EST server such as the EST server 304 described herein in connection with FIG. 3. At that point the same communication could take place via an EST protocol, which is wrapped in TLS. Renewals of these types of data may be handled using the methods described herein, even in situations where the original address was provided using DHCP. This method may include an extension to EST to allow for the DHCP option requests.

Still further, in the examples described herein, TEAP may be used as part of the initial association of the client device 102 to the network comprising the first hop networking device 104, the authentication server 106, and the DHCP server 108, among other devices included within the network 100. Thus, when the client device 102 is coupled to the network 100 via coupling to the first hop networking device 104 or creating a WiFi connection, TEAP may be used to authenticate the client device 102 to the network and ensuring that the client device 102 is a valid participant within the network 100. TEAP then allows the client device 102 to chain other operations onto the end of the initial authentication. Thus, the client device can log onto the network 100, and authenticate the client device 102 as to the authentication server 106 using TEAP and the encrypted tunnel created by TEAP. The authentication server 106 may validate the credentials provided to it by the client device 102. Once validated as to the authentication server 106, the client device 102 may also use the encrypted tunnel created by TEAP to obtain the DHCP information requested within the DHCP requests such as Layer 3 (L3) addressing information.

As depicted in FIG. 1 at 112 and 114, the client device may send a first request to the authentication server 106 via the first hop networking device 104. As designated at 112 and 114, the first request may include a message authentication code (MAC). The MAC may be any piece of information or data used to authenticate the message sent at 112 and 114 and is used to confirm that the message came from the client device 102 as the stated sender to indicate its authenticity and that the message has not been changed since being transmitted. The MAC value protects the integrity of the first request, as well as the authenticity of the first request, by allowing the authentication server 106 that also possess the secret key to detect any changes to the message content of the first request.

The first request may also include a number of options (e.g., "opts" as indicated in FIG. 1) the client device 102 seeks to obtain from the authentication server 106 and/or DHCP server 108. The number of options requested by the client device 102 and/or supplied by the authentication server 106 and/or the DHCP server 108 may include any options including those DHCP options described at https://www.cisco.com/c/en/us/td/docs/net_mgmt/prime/network_registrar/9-0/dhcp/guide/DHCP_Guide/DHCP_Guide_appendix_01101.pdf, the entirety of which is incorporated herein by reference. The options may also include any vendor extensions or vendor options. The options may also include any parameters described herein. Configuration parameters and other control information are carried in tagged data items that are stored in the options field of the DHCP options messages. The data items themselves are also called options.

In one example, an additional DHCP option may be defined. The additional DHPC option my serve to locate the authentication server 106 such that layer 3 (L3) communications may be established in subsequent communications between the computing device 102 and the authentication server 106. This additional DHCP option may be referred to as an authentication server location option and may be stored in a database of the computing device 102.

The DHCP options described herein may be placed into a TEAP extension. The client device 102 may encrypt a communication (e.g., data) using the TLS. Once established, the DHCP options are included within the communication via an encrypted tunnel. The endpoint of the encrypted tunnel is not the first hop networking device 104, but is, instead, the authentication server 106. In this manner, the first hop networking device 104 does not have knowledge of the communication or the data contained therein. The authentication server 106 serves as the authentication server that EAP uses to authenticate the client device 102 as to the DHCP server 108.

In one example, a new DHCP option may be defined that allows for the location of the authentication server 106 so that the client device 102 may, at a later time, communicate with the authentication server 106 at L3.

In the examples described herein, the client device 102 may request DHCP options such as an IP address and/or a network mask, and the authentication server 106 and/or the DHCP server 108 may provide one or more of these options as well as at least one additional option not included within the request from the client device 102 such as, for example, a vender option, a domain name, data identifying a domain name system (DNS) server, data defining a printing device within the network, data defining an authentication server to which the client device may send additional options requests, or any other additional but non-requested options.

The first request sent at 112 may also include an API wrapper such as a TEAP or EAP (e.g., EAP over local area network (LAN) (EAPoL). The API wrapper serves to secure data transmitted between the client device 102, the first hop networking device 104, the authentication server 106 and/or the DHCP server 108. When sending the first request from the client device 102 to the authentication server 106 and/or the DHCP server 108, a DHCP version 6 (DHCPv6) YANG model may be serialized into either JSON, CBOR, or XML at 112 and 114. Further, the first request may be secured using an API protocol or call such as a RESTful call at 112. Still further, the first request may be encapsulated and secured using TEAP or EAP at 112.

The first request transmitted by the first hop networking device 104 to the authentication server 106 at 114 may include an API wrapper that utilizes any tunneling protocol. The tunneling protocol that may be utilized at 114 may include, for example, remote authentication dial-in user service (RADIUS) networking protocol, Diameter networking protocol, or other tunneling protocol. Further, the first hop networking device 104 may utilize REST or TEAP. The API wrapper serves to secure data transmitted between the client device 102, the first hop networking device 104, the authentication server 106 and/or the DHCP server 108. As the authentication packet at 112 is received by the first hop networking device 104, the authentication packet may include the MAC address of the client device 102 and the EAP payload. This information is received at layer 2 (L2) (e.g., the data link layer). The first hop networking device 104 receives this data, and formats the MAC address and the EAP payload into a request that utilizes the tunneling protocols described above (e.g., a RADIUS request).

In one example, the client device may, instead, directly communicate with the authentication server 106 as depicted at 116 of FIG. 1. In this example, the client device 102 may be securely configured and authenticated as to the network 100 by utilizing any provisioning protocols including, for example, EST, simple certificate enrollment protocol (SCEP) enabled server, a certificate management protocol (CMP) enabled server, a certificate management over cryptographic message syntax (CMS) (CMC) enabled server, an automatic certificate management environment (ACME) protocol enabled server, and other types of provisioning protocols. It is noted that these provisioning protocols may be selected to run over HTTP. As depicted in FIG. 1 at 116, the client device may send the first request to the authentication server 106 where the first request includes a MAC and the number of the client device 102 seeks to obtain from the authentication server 106 and/or DHCP server 108. Further, the first request sent at 116 may be sent via enrollment over secure transport (EST) protocol which may be wrapped in TLS cryptographic protocol to provide privacy and security to the first message sent via 116. In this example, the authentication server 106 may include EST capabilities.

At 118, the authentication server 106 may send the first request received on to the DHCP server 108 in instances where the authentication server 106 does not implement DHCP. In this example, the message sent at 118 may be API (e.g., RESTful) request as a DHCP gateway. The message sent at 118 may include an HTTP or HTTPS protocol based message.

Once the first request is sent from the client device 102 via either 112 and 114 or 116 as described herein, and/or transmitted to the DHCP server 10 at 118, a response may be prepared by the authentication server 106 and/or the DHCP server 108.

The response may include at least a first DHCP option that was requested by the client device 102 as well as at least a second DHCP option that was not requested by the client device 102. In other words, the DHCP server 108 and/or the authentication server 106 may provide at least a second DHCP option being a non-requested option with respect to the at least first DHCP option. In this manner, the authentication server 106 and/or the DHCP server 108 may over provision the client device 102 with a number of options. In one example, the non-requested option(s) may include an option that provides a pointer to an EST server such as the authentication server 106. Thus, in this example, the DHCP server 108 and/or the authentication server 106 may provide a superset of options to the client device.

In one example, the DHCP server 108 and/or the authentication server 106 may provide a subset of options. In this example, the client device 102 may request a plurality of options from the DHCP server 108 and/or the authentication server 106 and the DHCP server 108 and/or the authentication server 106 may provide a response including fewer than those options requested. For example, the client device 102 may request a plurality of options including an option related to the location of the client device 102. In this example, the DHCP server 108 and/or the authentication server 106 may not be able to access or may not have this information, and cannot respond with this option. In one example, the DHCP server 108 and/or the authentication server 106 may send a message to the client device indicating that one or more of the options could not be provided.

In one example, TLS authentication may be performed, and the DHCP requests (e.g., an IP address, printer devices, etc. as included in DHCP protocols) for the client device 102 may be included within the encrypted tunnel. The DHCP server 108, having authenticated the client device 102 via the authentication server 106, processes the DHCP requests from the client device 102 and performs various processing as to the DHCP requests. The processing as to the DHCP requests may include, for example, IP address leasing, IP address lease queries when the IP address lease begins to expire, information regarding an EST server for later communication to the authentication server 106, details regarding a networked printing device, information about a DNS server, Windows Domain Controller data, IPv4 lease information, IPv6 managed lease information, among other types of information.

Thus, the objective of the present systems and methods is to obtain an authenticated and authorized communication path to the authentication server 106 and perform DHCP address allocation thereafter. This ensures that the client device 102 obtains an address the client device is authorized to obtain. The use of TEAP and the encrypted tunnel provides full encryption and privacy of all these operations up to the point where the client device 102 may establish connections with other devices (mail servers, web servers, etc.) on the network using IP to access network resources 110 as indicated at 120.

Although the client device(s) 102, the first hop network device 104, the authentication server 106, the DHCP server 108, and the network resources 110, are included within the network 100 of FIG. 1, any other computing device may be included within the network 100. For example, other intermediary computing devices may be included between those computing devices included within the network 100.

The network resources 110 may include any service providers the client device 102 may utilize during execution of one or more applications at the client device 102. The client device 102 may utilize a number of parameters and options described herein to gain access to and receive the network resources 110. The network resources may reside anywhere within the network 110, and the authentication server 106 may provide options to the client device 102 that point to the network resources 110 by providing responses to the client device 102 via 112, 114, and/or 116. In one example, the authentication server 106 may handle access for the client device 102 to the network resources 110 by directing the first hop networking device 104 (or other networked devices) to permit or deny the client device 102 access to the network resources 110. Access to the network resources 110 may be had over 120 via the first hop networking device 104 and/or directly over 122.

In the example of FIG. 1, any number of intervening network devices may be included at 114, 118, 120. In this example, the intervening network devices may be included within an IP network.

Figure 2:
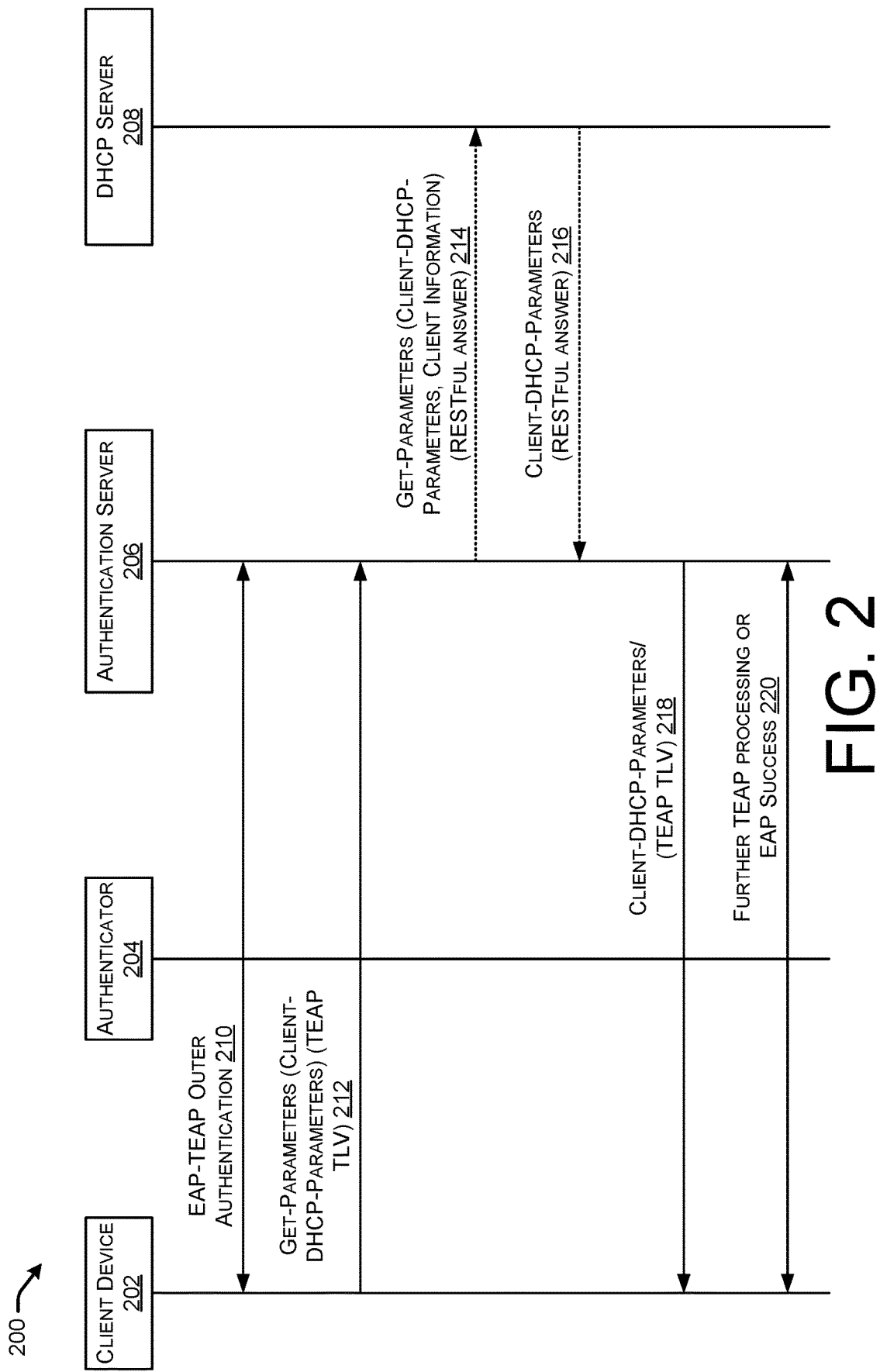
FIG. 2 illustrates a call flow diagram of a secure network configuration, according to an example of the principles described herein.

Having described the network 100 of FIG. 1, FIG. 2 illustrates a call flow diagram 200 of a secure network configuration, according to an example of the principles described herein. A client device 202 (e.g., the client devices 102 of FIG. 1) may communicate with an authenticator 204, the authentication server 206 (e.g., the authentication server 106 of FIG. 1) and the DHCP server 208 (e.g., the DHCP server 108 of FIG. 1). In one example, the authenticator 204 may be included as an element within the first hop networking device 104, the authentication server 206, and access point associated with the network 100, or other computing device within the network 100.

As the client device 202 boots up and/or begins communications via the network 100, the client device 202 may require an internet protocol (IP) address, as well as information regarding its local environment including, for example, information regarding, for example, a DNS server, a local printer, a network mask, a local time, standard extensions, standard options, vendor extensions, vendor options, among a myriad of additional forms and types of information. Thus, the client device 102 makes a first request for such information. In order to obtain this information, the client device 102 may send a broadcast to other devices within a local network requesting DHCP data and information. In one example, a first hop networking device 104 of FIG. 1 may provide one or more of this data to the client device 202. For example, the first hop networking device 104 may provide the client device 202 with an IP address, etc. This process may be performed at the Ethernet level within the network or within a user datagram protocol (UDP) frame within IP networking were the data is unencrypted. However, a large number of the options may be obtained from the authenticator 204, the authentication device 206, and/or the DHCP server 208.

Therefore, at 210, an outer authentication via EAP and/or TEAP may be performed to authenticate the client device 202 as to the authentication server 204. This outer authentication allows for the communication between the client device 202 and the authenticator 204/authentication server 206 to be secure and private.

Once the outer authentication has been established at 210, the client device 202 may send a first request to the authentication server 206 at 212. In communications between the client device 202, the authenticator 204, the authentication server 206, and/or the DHCP server 208, the DHCP-based messages such as DHCPv6 may utilize the YANG model to define information such as the parameters and options the client device 202 requests and the authentication server 206 and/or DHCP server 208 provide to the client device 202. In one example, because the YANG model is protocol independent and may be converted into any encoding format, such as, for example, XML, JSON, or CBOR, communications sent within the network 100 may be sent via any of these encoding formats the network configuration protocol supports. Further, utilization of the TEAP extension for communication paths between the client device 202 and the authentication server 306 allows for the communication between the client device 202 and the authentication server 306 to occur just prior to a normal DHCP interaction and does not require L3 connectivity.

The first request sent at 212 may include a request to obtain a number of parameters and options such as client device 202 parameters and options and DHCP parameters and options. As described herein, TEAP is a tunnel based EAP method that enables secure communication between a peer (e.g., client device 202) and an EAP server (e.g., authentication server 206) by using TLS to establish a mutually authenticated tunnel. Within the tunnel, type-length-value (TLV) objects are used to convey authentication related data between the EAP client device 202 and the EAP authentication server 206. The first request sent at 212 may, therefore, utilize TEAP and its associated TLV objects to make the request for the parameters and options. The parameters requested may include, for example, data related to an EST server (e.g., the authentication server 206) that may be used in later communications to the authentication server, data related to a network printing device, data related to an associated DNS server, data related to a Windows domain controller, data related to IP version 4 (IPv4) lease information, data related to IP version 6 (IPv6) managed lease information, other parameters, and combinations thereof. The options may include those options described herein.

The authentication server 206 may receive the first request from the client device 202. In one example, the authentication server 206 may have stored both requested and non-requested parameters and options to provide to the client device 202. In this example, the authentication server 206 may respond to the client device 202 at 218 with those requested and non-requested parameters and options without making such a request of or relaying the first request to the DHCP server 208.

In one example, the authentication server 206 may have stored requested and/or non-requested parameters and options to provide to the client device 202 and the DHCP server 208 may also have stored requested and/or non-requested parameters and options to provide to the client device 202. In this example, the authentication server 206 may obtain the requested and/or non-requested parameters and options the authentication server 206 may provide to the client device 202, and may transmit the first request from the client device 202 to the DHCP server 208 so that the DHCP server 208 may obtain the requested and/or non-requested parameters and options the DHCP server 208 may provide to the client device 202. In this example, the authentication server 206 acts as a DHCP gateway in transmitting the first request to the DHCP server 208.

In one example, the authentication server 206 may not have stored requested and/or non-requested parameters and options to provide to the client device 202 and, instead, the DHCP server 208 may have stored requested and/or non-requested parameters and options to provide to the client device 202. In this example, the authentication server 206 may transmit the first request from the client device 202 to the DHCP server 208 so that the DHCP server 208 may obtain the requested and/or non-requested parameters and options the DHCP server 208 may provide to the client device 202 without obtaining any such information from the authentication server. In this example, the authentication server 206 acts as a DHCP gateway in transmitting the first request to the DHCP server 208.

In one example, the client device 102, during the encryption, authentication, and transfer of DHCP options, may receive a relatively fewer number of DHCP options from the DHCP server 108 after authentication with the authentication server 106 and/or the DHCP server 108, and may receive additional network options using an enrollment over secure transport (EST) protocol. EST is described in RFC 7030. In this example utilizing EST protocols, a means to secure communication between the client device 102 and the authentication server 106 is provided via the EST protocol. Rather than accessing the authentication server 106 via the first hop networking device 104, the client device 102 may communication directly with the authentication server 106 as indicated by the dashed arrow in FIG. 1. The authentication server 106 includes features of an EST module capable of providing the functionality associated with this example. The EST protocol and the manner in which the present systems and methods utilize the EST protocol may be beneficial in, for example, instances where the client device needs to renew a leased IP address. Rather than use TEAP to obtain a renewal, it may be effective to simply communicate directly with the authentication server 106 including subsequent transactions after an initial authentication via TEAP as described herein. Thus, in this example, the DHCP server 108 may provide an IP and network address as well as a new option that provides a pointer to an EST server 110. At that point the same communication could take place via EST, which is wrapped in TLS. Renews may be handled using this method, even in situations where the original address was handed out using DHCP. This method would require only an extension to EST to allow for the DHCP option requests.

In examples where the authentication server 206 transmits the first request from the client device 202 to the DHCP server 208, at 214, the authentication server 206 may transmit the first request via an API call (e.g., a RESTful call) to the DHCP server 208. The request from the authentication server 206 to the DHCP server 208 may include a general request to the DHCP server 208 to get the parameters and options. Further, the request from the authentication server 206 to the DHCP server 208 may include an identification of those parameters and options that the client device 202 has requested and additional information defining the client device 202. Data defining the client device 202 may include, for example, a media access control (MAC) address of the client device 202, authentication data associated with the client device 202, data identifying the client device 202 and/or computing resources of the client device 202, other information defining the client device 202 and combinations thereof. In the examples described herein, the DHCP server 208 may be only necessary if the authentication server 206 does not implement the functionality of the DHCP server 208. Thus, the API call (e.g., the RESTful call) to the DHCP server 208 may be only required as a transitionary phase.

At 216, the DHCP server 208 responds to the communication from the authentication server 206 at 214 with a number of DHCP parameters and options. Again, as described herein, the DHCP server 208 may provide at least a first DHCP option that was requested by the client device 202 and at least a second DHCP option that is a non-requested option with respect to the at least first DHCP option.

The authentication server 206 may receive the message sent from the DHCP server 208 at 216 and transmit that information on to the client device 202 at 218. At 218, the authentication server 206 may utilize TEAP and its associated TLV objects to send the parameters and options to the client device 202. The client device 202 may then utilize the parameters and options to communicate and interact within the network 100. For example, the client device 202 may utilize the parameters and options to obtain services from the network resources 110 as depicted in FIG. 1.

At 220, additional processing may occur between the client device 202 and the authentication server 206 including, for example, further TEAP processing and/or EAP success messages. Thus, based on the above, the authenticator may facilitate the encryption of previously unencrypted DHCP options by serializing a DHCPv6 YANG model into either XML, JSON, or CBOR, and applying an API wrapper such as, for example, a REST wrapper.

FIG. 3 illustrates a call flow diagram 300 of a secure network configuration, according to an example of the principles described herein. The call flow of FIG. 3 utilizes similar techniques as presented above in connection with the call flow diagram 200 depicted in FIG. 2. However, as indicated in FIG. 3, the call flow diagram 300 depicts a client device 302 communicatively coupled to an EST server 304 and a DHCP server. The EST sever 304 may include the authentication server 106 depicted in FIG. 1 where the authentication server 106 is EST enabled. However, the EST server 304 may be or include any provision service and associated network infrastructure and hardware to perform the processes described herein. For example, the EST server 304 may include, for example, a simple certificate enrollment protocol (SCEP) enabled server, a certificate management protocol (CMP) enabled server, a certificate management over cryptographic message syntax (CMS) (CMC) enabled server, an automatic certificate management environment (ACME) protocol enabled server, and other types of provisioning servers and respective protocols. Further, the call flow diagram 300 of FIG. 3 may utilize pathway 116 as depicted in FIG. 1 in order to utilize the EST protocol which, in one example, may be wrapped in TLS cryptographic protocol to provide privacy and security to the first message sent via 116.

At 308, an outer authentication via the TLS protocol may be performed to authenticate the client device 202 as to the authentication server 204. This outer authentication allows for the communication between the client device 302 and the EST server 304 (e.g., the authentication server 106 of FIG. 1) to be secure and private.

At 310, the client device 302 may transmit a first request to the EST server 304. In communications between the client device 302, the EST server 304, and/or the DHCP server 306, the DHCP-based messages such as DHCPv6 may utilize the YANG model to define information such as the parameters and options the client device 302 requests and the authentication server 304 and/or DHCP server 306 provide to the client device 302. In one example, because the YANG model is protocol independent and may be converted into any encoding format, such as, for example, XML, JSON, or CBOR, communications sent within the network 100 may be sent via any of these encoding formats the network configuration protocol supports.

The first request sent at 310 may include a request to obtain a number of parameters and options such as client device 302 parameters and options and DHCP parameters and options. As described herein, TEAP is a tunnel based EAP method that enables secure communication between a peer (e.g., client device 302) and the EAP server 304 (e.g., authentication server 206) by using TLS to establish a mutually authenticated tunnel. Within the tunnel, type-length-value (TLV) objects are used to convey authentication related data between the EAP client device 302 and the EAP server 306. The first request sent at 310 may, therefore, utilize TEAP and its associated TLV objects to make the request for the parameters and options. The parameters and options requested may include any of those parameters and options described herein.

The EST server 304 may receive the first request from the client device 302. In one example, the EST server 304 may have stored both requested and non-requested parameters and options to provide to the client device 302. In this example, the EST server 304 may respond to the client device 302 at 316 with those requested and non-requested parameters and options without making such a request of or relaying the first request to the DHCP server 306.

In one example, the EST server 304 may have stored requested and/or non-requested parameters and options to provide to the client device 302 and the DHCP server 306 may also have stored requested and/or non-requested parameters and options to provide to the client device 302. In this example, the EST server 304 may obtain the requested and/or non-requested parameters and options the EST server 304 may provide to the client device 302, and may transmit the first request from the client device 302 to the DHCP server 306 so that the DHCP server 306 may obtain the requested and/or non-requested parameters and options the DHCP server 306 may provide to the client device 302. In this example, the EST server 304 acts as a DHCP gateway in transmitting the first request to the DHCP server 306.

In one example, the EST server 304 may not have stored requested and/or non-requested parameters and options to provide to the client device 302 and, instead, the DHCP server 306 may have stored requested and/or non-requested parameters and options to provide to the client device 302. In this example, the EST server 304 may transmit the first request from the client device 302 to the DHCP server 306 so that the DHCP server 306 may obtain the requested and/or non-requested parameters and options the DHCP server 306 may provide to the client device 302 without obtaining any such information from the authentication server. In this example, the EST server 304 acts as a DHCP gateway in transmitting the first request to the DHCP server 306.

In examples where the EST server 304 transmits the first request from the client device 302 to the DHCP server 306, at 312, the EST server 304 may transmit the first request via an API call (e.g., a RESTful call) to the DHCP server 306. The request from the EST server 304 to the DHCP server 306 may include a general request to the DHCP server 306 to get the parameters and options. Further, the request from the EST server 304 to the DHCP server 306 may include an identification of those parameters and options that the client device 302 has requested and additional information defining the client device 302. Data defining the client device 302 may include, for example, a media access control (MAC) address of the client device 302, authentication data associated with the client device 302, data identifying the client device 302 and/or computing resources of the client device 302, other information defining the client device 302, and combinations thereof.

At 314, the DHCP server 306 responds to the communication from the EST server 304 at 312 with a number of DHCP parameters and options. Again, as described herein, the DHCP server 306 may provide at least a first DHCP option that was requested by the client device 302 and at least a second DHCP option that is a non-requested option with respect to the at least first DHCP option.

The EST server 304 may receive the message sent from the DHCP server 306 at 314 and transmit that information on to the client device 302 at 316. At 316, the EST server 304 may utilize TEAP and its associated TLV objects to send the parameters and options to the client device 302. The client device 302 may then utilize the parameters and options to communicate and interact within the network 100.

At 318, additional processing may occur between the client device 302 and the EST server 304 including, for example, further TEAP processing and/or EAP success messages. Thus, based on the above, the client device 102 and the EST server 304 may facilitate the encryption of previously unencrypted DHCP options by serializing a DHCPv6 YANG model into either XML, JSON, or CBOR, and applying an API wrapper such as, for example, a REST wrapper.

In one example, Device Provisioning Protocol (DPP) may be used to bootstrap learning an API endpoint (e.g., a RESTful endpoint) such as the client device 102, 202, 302.

During the configuration phase of DPP, a server URL may be passed to the client device 102, 202, 302, along with a list of parameters that the client device 102, 202, 302 requests. In this example, the client device 102, 202, 302 uses the parameters to initially configure, and then contacts the authentication server 106 to negotiate leases or lease renewals. Further, during the configuration phase of DPP, a server URL may be passed to the client device 102, along with a list of parameters that the client device 102 requests. The client device 102 uses the parameters to initially configure, and then contacts the authentication server 106 to negotiate leases or lease renewals. Thus, although EAP may be used to authenticate the network as described in other examples herein, DPP may be used instead. DPP includes a configuration frame that may be extended to include the DHCP requests to the authentication server 106 and/or DHCP server 108 and the associated responses.

In all the examples described herein, once the client device 102, 202, 302 has been authenticated within the network and received one or more DHCP options, access may be granted to the client device 102 to access a number of network resources 110 such as a mail server, a web server, and any other type of network related services and resources.

In one example, at 320, the call flow diagram 300 may further include an optional process of provisioning operations with respect to the client device 302. The provisioning operations may include provisioning of any resources to the client device 102 such as, for example, server provisioning, authorization provisioning, network provisioning, service provisioning, and other types of resource provisioning.

Figure 4:
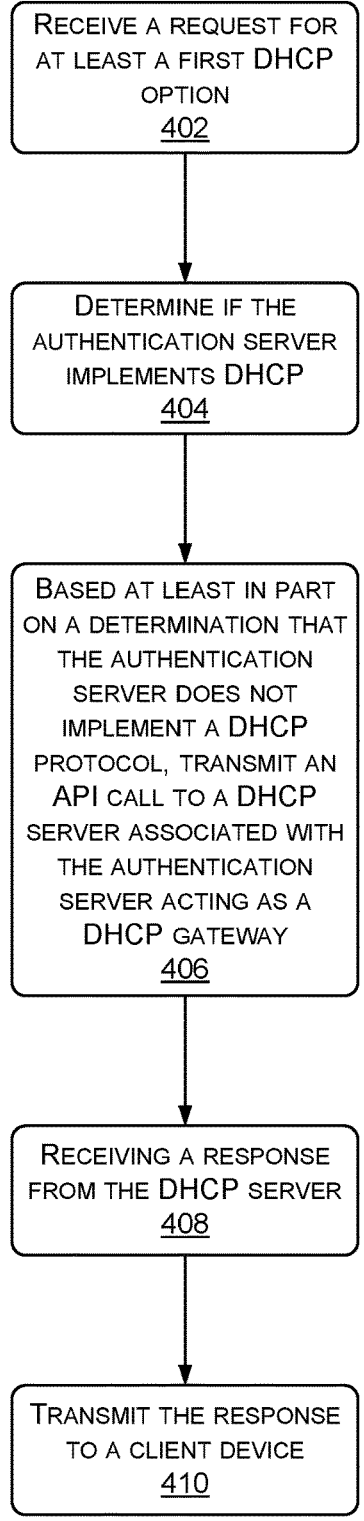
FIG. 4 illustrates a flow diagram of an example method of securely configuring a network, according to an example of the principles described herein.

FIG. 4 illustrates a flow diagram of an example method 400 of securely configuring a network 100, according to an example of the principles described herein. The method 400 may include, at an authentication server 106, receiving, from a client device 102, a request for at least a first DHCP option at 402. At 404, it may be determined if the authentication server 404 implements DHCP. Based at least in part on a determination that the authentication server 404 does not implement a DHCP, the method 400 may include, at 406, transmitting an API call to a DHCP server 108 associated with the authentication server 106 with the authentication server 106 acting as a DHCP gateway At 408, the authentication server 106 may receive a response from the DHCP server 108. At 410, the authentication server 106 may transmit the response to the client device 102. In this manner, the client device is provisioned a number of DHCP options for interaction within the network 100.

Figure 5:
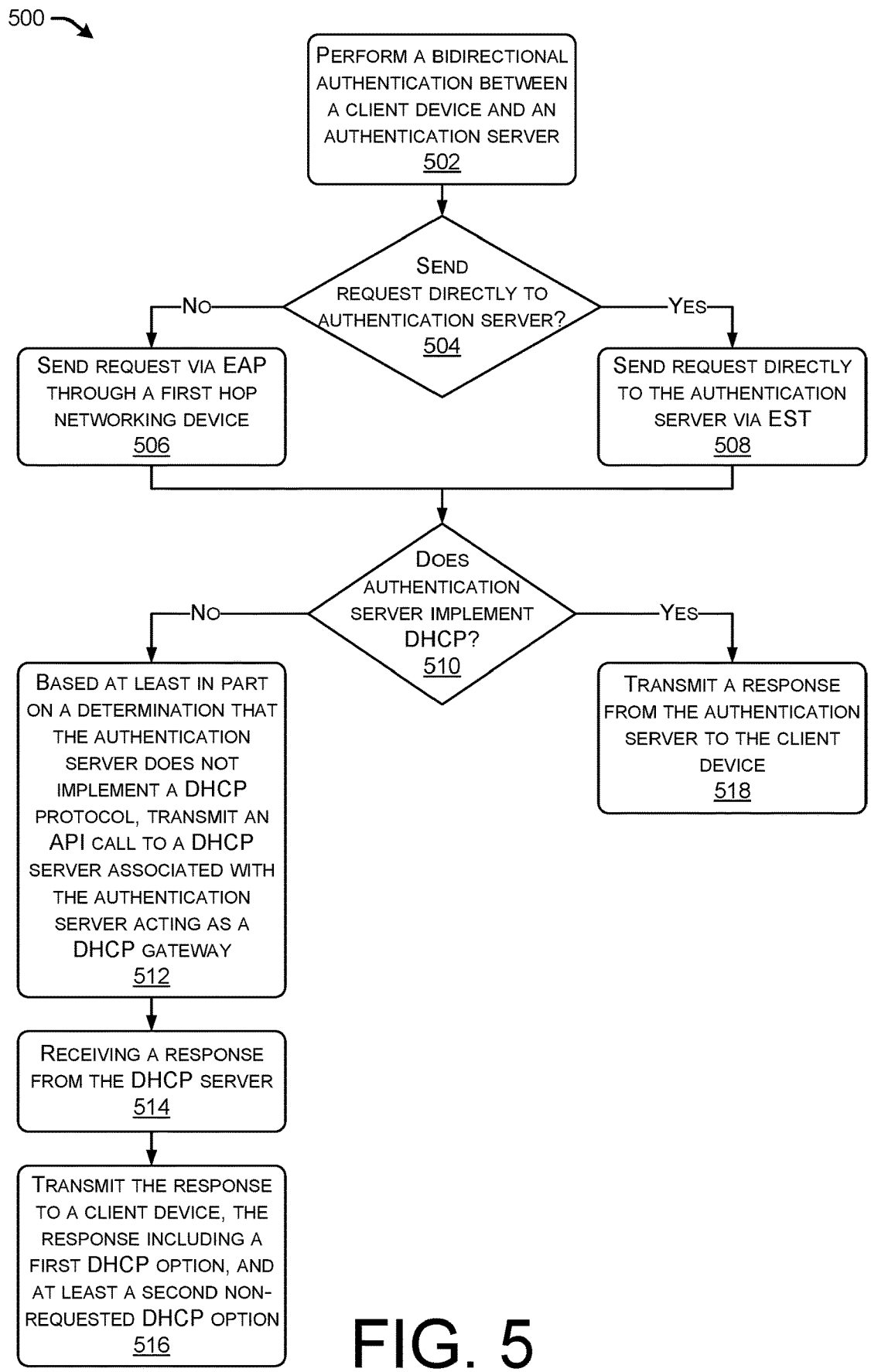
FIG. 5 illustrates a flow diagram of an example method of securely configuring a network, according to an example of the principles described herein.

FIG. 5 illustrates a flow diagram of an example method 500 of securely configuring a network, according to an example of the principles described herein. At 502, a bidirectional authentication may be performed between the client device 102 and the authentication server 106. This bidirectional authentication may utilize any protocol or method to authenticate the client device 102 as to the first hop networking device 104, the authentication server 106, the authenticator 204 of FIG. 2, other computing devices and systems within the network 100, and combinations thereof.

Once the bidirectional authentication has been established at 502, it may be determined whether the first request from the client device 102 should be sent directly to the authentication server 106 or via the first hop device 104 or another intervening device at 504. In response to a determination that the first request from the client device 102 should not be sent directly to the authentication server 106 (504, determination NO), the first request may be sent via EAP through the first hop networking device 104 as indicated at 506. In contrast, in response to a determination that the first request from the client device 102 should be sent directly to the authentication server 106 (504, determination YES), the first request may be sent via EST to the authentication server 106 as indicated at 508. The different paths indicted at 506 and 508 are further described herein with regard to a first communication path including 112 and 114 and a second communication path including 116 as depicted in FIG. 1.

In either scenario including 506 and 508, it may be determined whether the authentication server 106 implements DHCP at 510. In response to a determination that the authentication server 102 does implement DHCP (510, determination YES), the method 500 may include transmitting a response from the authentication server 106 to the client device 102. As described herein, the authentication server 106 may receive the first request from the client device 202. In one example, the authentication server 206 may have stored both requested and non-requested parameters and options to provide to the client device 202. In this example, the authentication server 206 may respond to the client device 202 at 518 with those requested and non-requested parameters and options without making such a request of or relaying the first request to the DHCP server 208. At 518, even though the authentication server 106 provides the client device 102 with the requested and non-requested parameters and options, in subsequent requests transmitted by the client device 102, the authentication server 106 may send a request on to the DHCP server 108 for additional information, parameters, and/or options as described herein.

In response to a determination that the authentication server 102 does not implement DHCP (510, determination NO), the method 500 may include transmitting, at 512, an API call to the DHCP server 108 associated with the authentication server 106 where the authentication server acts as a DHCP gateway. As described herein, the authentication server 206 may have stored requested and/or non-requested parameters and options to provide to the client device 202 and the DHCP server 208 may also have stored requested and/or non-requested parameters and options to provide to the client device 202. In one example of 512, the authentication server 206 may obtain the requested and/or non-requested parameters and options the authentication server 206 may provide to the client device 202, and may transmit the first request from the client device 202 to the DHCP server 208 so that the DHCP server 208 may obtain the requested and/or non-requested parameters and options the DHCP server 208 may provide to the client device 202. In this example, the authentication server 206 acts as a DHCP gateway in transmitting the first request to the DHCP server 208. Further, in one example of 512, the authentication server 206 may not have stored requested and/or non-requested parameters and options to provide to the client device 202 and, instead, the DHCP server 208 may have stored requested and/or non-requested parameters and options to provide to the client device 202. In this example, the authentication server 206 may transmit the first request from the client device 202 to the DHCP server 208 so that the DHCP server 208 may obtain the requested and/or non-requested parameters and options the DHCP server 208 may provide to the client device 202 without obtaining any such information from the authentication server. In this example, the authentication server 206 acts as a DHCP gateway in transmitting the first request to the DHCP server 208.

At 514, the authentication server 106 may receive a response from the DHCP server including a number of the requested and/or non-requested parameters and options as described herein. The authentication server 106 may transmit the response at 516 to the client device 102. In one example, the response to the client device 102 at 516 may include a first DHCP option that was requested by the client device 102 and at least a second DHCP option that was not requested by the client device 102. In this manner, the authentication server 106 and/or the DHCP server 108 may over provision the client device 102 with a number of options. In one example, the non-requested option(s) may include an option that provides a pointer to an EST server such as the authentication server 106.

Figure 6:
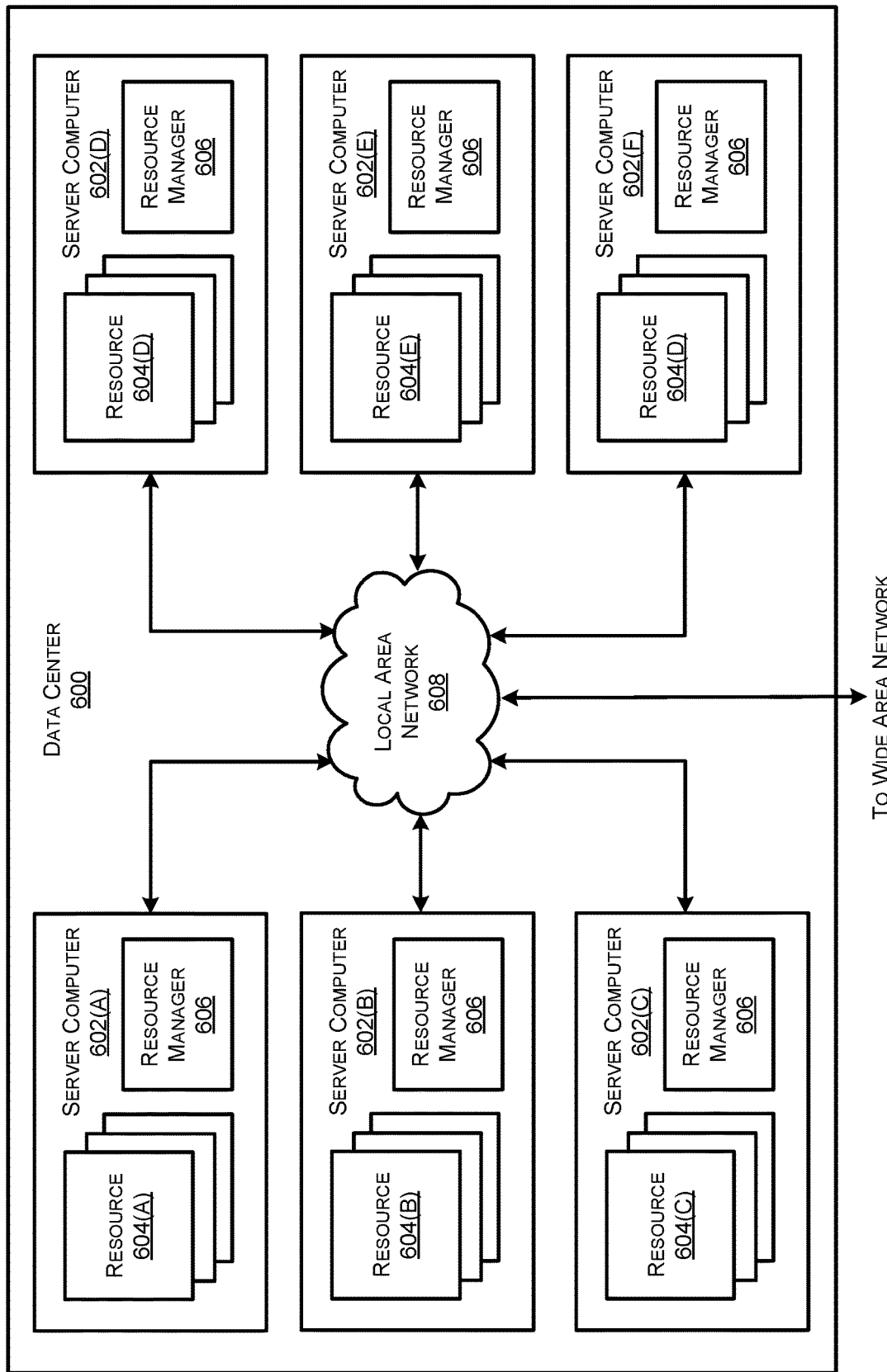
FIG. 6 illustrates a computing system diagram illustrating a configuration for a data center that may be utilized to implement aspects of the technologies disclosed herein.

FIG. 6 illustrates a computing system diagram illustrating a configuration for a data center 600 that may be utilized to implement aspects of the technologies disclosed herein. The example data center 600 shown in FIG. 6 includes several server computers 602A-602F (which might be referred to herein singularly as "a server computer 602" or in the plural as "the server computers 602") for providing computing resources. In some examples, the resources and/or server computers 602 may include, or correspond to, any type of networked device described herein. Although described as servers, the server computers 602 may comprise any type of networked device, such as servers, switches, routers, hubs, bridges, gateways, modems, repeaters, access points, etc.

The server computers 602 may be standard tower, rackmount, or blade server computers configured appropriately for providing computing resources. In some examples, the server computers 602 may provide computing resources 604 including data processing resources such as VM instances or hardware computing systems, database clusters, computing clusters, storage clusters, data storage resources, database resources, networking resources, virtual private networks (VPNs), and others. Some of the server computers 602 may also be configured to execute a resource manager 606 capable of instantiating and/or managing the computing resources. In the case of VM instances, for example, the resource manager 606 may be a hypervisor or another type of program configured to enable the execution of multiple VM instances on a single server computer 602. Server computers 602 in the data center 600 may also be configured to provide network services and other types of services.

In the example data center 600 shown in FIG. 6, an appropriate LAN 608 is also utilized to interconnect the server computers 602A-602F. It may be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between data centers 600, between each of the server computers 602A-602F in each data center 600, and, potentially, between computing resources in each of the server computers 602. It may be appreciated that the configuration of the data center 600 described with reference to FIG. 6 is merely illustrative and that other implementations may be utilized.

In some examples, the server computers 602 and or the computing resources 604 may each execute/host one or more tenant containers and/or virtual machines to perform techniques described herein.

In some instances, the data center 600 may provide computing resources, like tenant containers, VM instances, VPN instances, and storage, on a permanent or an as-needed basis. Among other types of functionality, the computing resources provided by a cloud computing network may be utilized to implement the various services and techniques described herein. The computing resources 604 provided by the cloud computing network may include various types of computing resources, such as data processing resources like tenant containers and VM instances, data storage resources, networking resources, data communication resources, network services, VPN instances, and the like.

Each type of computing resource 604 provided by the cloud computing network may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The cloud computing network may also be configured to provide other types of computing resources 604 not mentioned specifically herein.

The computing resources 604 provided by a cloud computing network may be enabled in one example by one or more data centers 600 (which might be referred to herein singularly as "a data center 600" or in the plural as "the data centers 600"). The data centers 600 are facilities utilized to house and operate computer systems and associated components. The data centers 600 typically include redundant and backup power, communications, cooling, and security systems. The data centers 600 may also be located in geographically disparate locations. One illustrative example for a data center 600 that may be utilized to implement the technologies disclosed herein is described herein with regard to, for example, FIGS. 1 through 5.

Figure 7:
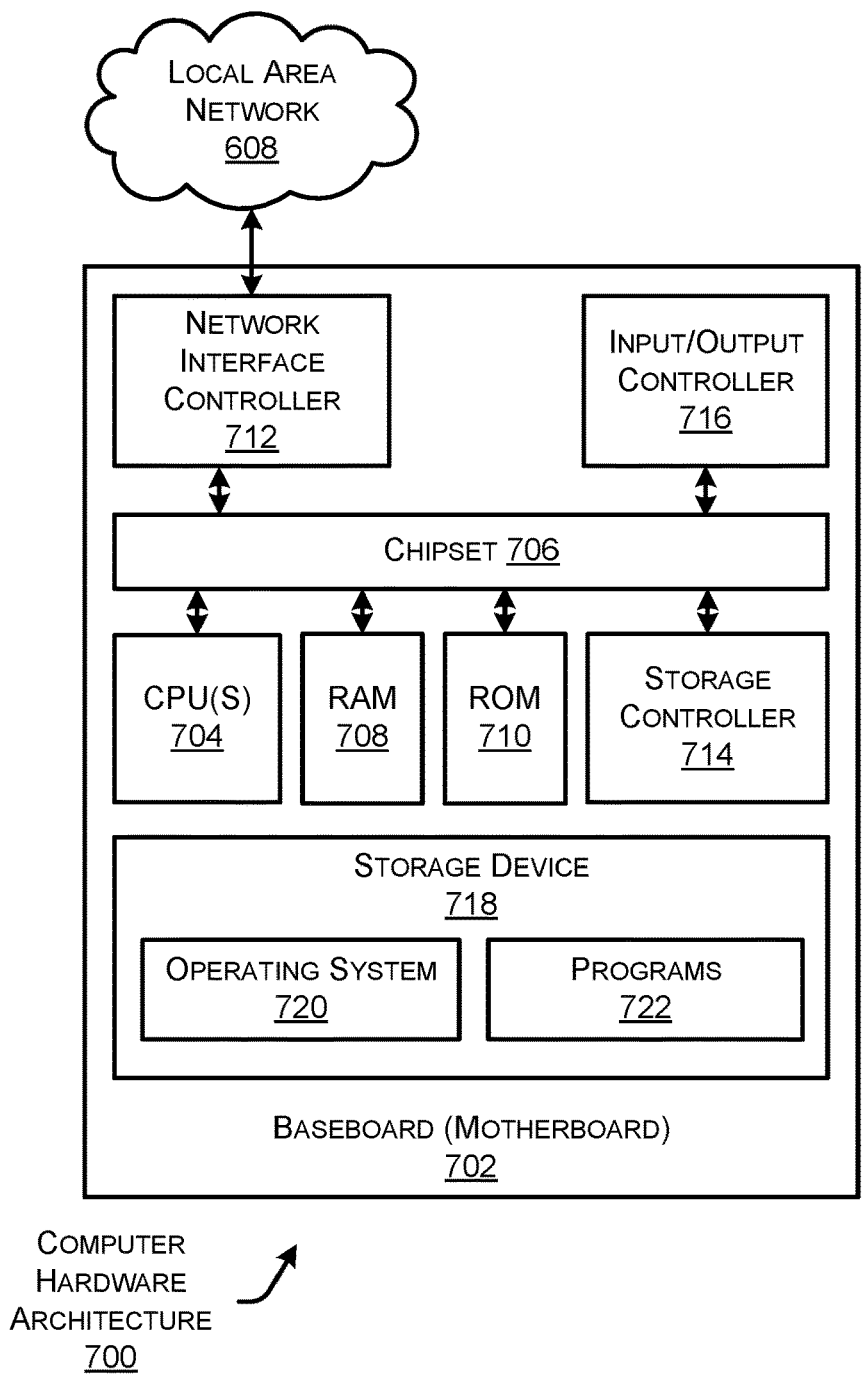
FIG. 7 illustrates a computer architecture diagram showing an example computer hardware architecture for implementing a computing device that may be utilized to implement aspects of the various technologies presented herein.

FIG. 7 illustrates a computer architecture diagram showing an example computer hardware architecture 700 for implementing a computing device that may be utilized to implement aspects of the various technologies presented herein. The computer hardware architecture 700 shown in FIG. 7 illustrates the client device 102, the first hop networking device 104, the authentication server 106, the DHCP server 108, the network resources 110, similar devices included in FIGS. 2 through 3, and/or other systems or devices associated with these computing devices and/or remote from these computing devices, a workstation, a desktop computer, a laptop, a tablet, a network appliance, an e-reader, a smartphone, or other computing device, and combinations thereof. These computing devices may be utilized to execute any of the software components described herein. The computer 700 may, in some examples, correspond to a network device (e.g., the client device 102, the first hop networking device 104, the authentication server 106, the DHCP server 108, the network resources 110, and/or similar devices included in FIGS. 2 through 3 (and associated devices) described herein, and may comprise networked devices such as servers, switches, routers, hubs, bridges, gateways, modems, repeaters, access points, etc.

The computer 700 includes a baseboard 702, or "motherboard," which is a printed circuit board to which a multitude of components or devices may be connected by way of a system bus or other electrical communication paths. In one illustrative configuration, one or more central processing units (CPUs) 704 operate in conjunction with a chipset 706. The CPUs 704 may be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 may provide an interface to a RAM 708, used as the main memory in the computer 700. The chipset 706 may further provide an interface to a computer-readable storage medium such as a read-only memory (ROM) 710 or non-volatile RAM (NVRAM) for storing basic routines that help to startup the computer 700 and to transfer information between the various components and devices. The ROM 710 or NVRAM may also store other software components necessary for the operation of the computer 700 in accordance with the configurations described herein.

The computer 700 may operate in a networked environment using logical connections to remote computing devices and computer systems through a network, such as the client device 102, the first hop networking device 104, the authentication server 106, the DHCP server 108, the network resources 110, similar devices included in FIGS. 2 through 3, among other devices. The chipset 706 may include functionality for providing network connectivity through a Network Interface Controller (NIC) 712, such as a gigabit Ethernet adapter. The NIC 712 is capable of connecting the computer 700 to other computing devices within the network 100 and external to the network 100. It may be appreciated that multiple NICs 712 may be present in the computer 700, connecting the computer to other types of networks and remote computer systems. In some examples, the NIC 712 may be configured to perform at least some of the techniques described herein, such as packet redirects and/or other techniques described herein.

The computer 700 may be connected to a storage device 718 that provides non-volatile storage for the computer. The storage device 718 may store an operating system 720, programs 722 (e.g., any computer-readable and/or computer-executable code described herein), and data, which have been described in greater detail herein. The storage device 718 may be connected to the computer 700 through a storage controller 714 connected to the chipset 706. The storage device 718 may consist of one or more physical storage units. The storage controller 714 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 700 may store data on the storage device 718 by transforming the physical state of the physical storage units to reflect the information being stored. The specific transformation of physical state may depend on various factors, in different examples of this description. Examples of such factors may include, but are not limited to, the technology used to implement the physical storage units, whether the storage device 718 is characterized as primary or secondary storage, and the like.

For example, the computer 700 may store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the storage device 718 by detecting the physical states or characteristics of one or more particular locations within the physical storage units.

In addition to the storage device 718 described above, the computer 700 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer 700. In some examples, the operations performed by the client device 102, the first hop networking device 104, the authentication server 106, the DHCP server 108, the network resources 110, similar devices included in FIGS. 2 through 3, and or any components included therein, may be supported by one or more devices similar to computer 700. Stated otherwise, some or all of the operations performed by the client device 102, the first hop networking device 104, the authentication server 106, the DHCP server 108, the network resources 110, similar devices included in FIGS. 2 through 3, and or any components included therein, may be performed by one or more computer devices operating in a cloud-based arrangement.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 718 may store an operating system 720 utilized to control the operation of the computer 700. According to one example, the operating system 720 comprises the LINUX operating system. According to another example, the operating system comprises the WINDOWS® SERVER operating system from MICROSOFT Corporation of Redmond, Washington According to further examples, the operating system may comprise the UNIX operating system or one of its variants. It may be appreciated that other operating systems may also be utilized. The storage device 718 may store other system or application programs and data utilized by the computer 700.

In one example, the storage device 718 or other computer-readable storage media is encoded with computer-executable instructions which, when loaded into the computer 700, transform the computer from a general-purpose computing system into a special-purpose computer capable of implementing the examples described herein. These computer-executable instructions transform the computer 700 by specifying how the CPUs 704 transition between states, as described above. According to one example, the computer 700 has access to computer-readable storage media storing computer-executable instructions which, when executed by the computer 700, perform the various processes described above with regard to FIGS. 1 through 6. The computer 700 may also include computer-readable storage media having instructions stored thereupon for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. Similarly, an input/output controller 716 may provide output to a display, such as a computer monitor, a flat-panel display, a digital projector, a printer, or other type of output device. It will be appreciated that the computer 700 might not include all of the components shown in FIG. 7, may include other components that are not explicitly shown in FIG. 7, or might utilize an architecture completely different than that shown in FIG. 7.

As described herein, the computer 700 may comprise one or more of the client device 102, the first hop networking device 104, the authentication server 106, the DHCP server 108, the network resources 110, similar devices included in FIGS. 2 through 3, and/or other systems or devices associated with these computing devices and/or remote from these computing devices. The computer 700 may include one or more hardware processor(s) such as the CPUs 704 configured to execute one or more stored instructions. The CPUs 704 may comprise one or more cores. Further, the computer 700 may include one or more network interfaces configured to provide communications between the computer 700 and other devices, such as the communications described herein as being performed by the client device 102, the first hop networking device 104, the authentication server 106, the DHCP server 108, the network resources 110, similar devices included in FIGS. 2 through 3, and other devices described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 722 may comprise any type of programs or processes to perform the techniques described in this disclosure for the client device 102, the first hop networking device 104, the authentication server 106, the DHCP server 108, the network resources 110, similar devices included in FIGS. 2 through 3 as described herein. The programs 722 may enable the devices described herein to perform various operations.

CONCLUSION

The examples described herein provide systems and methods to encrypt previously unencrypted dynamic host configuration protocol (DHCP) options by serializing a Dynamic Host Configuration Protocol (DHCP) version 6 (DHCPv6) YANG model into either extensible markup language (XML), JavaScript object notation (JSON), or concise (or compact) binary object representation (CBOR), and applying a representational state transfer (REST) wrapper. With the above-described systems and methods, DHCP options may be transmitted to a client device in a secure manner and using the YANG model and applying an API wrapper.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure, and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A non-transitory computer-readable medium storing instructions that, when executed, cause one or more processors to perform operations, comprising:
   at an authentication server, receiving, from a client device, a request for a first dynamic host configuration protocol (DHCP) option;
   determining if the authentication server implements DHCP;
   based at least in part on a determination that the authentication server does not implement a DHCP, transmitting an application program interface (API) call to a DHCP server associated with the authentication server acting as a DHCP gateway, a representational state transfer (REST) wrapper being applied to the API call such that the first DHCP option is secured;
   receiving a response from the DHCP server; and based at least in part on the authentication server does implement DHCP protocol, transmitting to the client device a response from the authentication server; transmitting the response received from the DHCP server to the client device, wherein the response received from the DHCP server comprises: the first DHCP option; and a second DHCP option separated from the first DHCP option, the second DHCP option being a non-requested option with respect to the first DHCP option and comprising a pointer to the authentication server.

2. The non-transitory computer-readable medium of claim 1, the operations further comprising:
   based at least in part on the authentication server does implement DHCP protocol, transmitting to the client device a response from the authentication server.

3. The non-transitory computer-readable medium of claim 1, wherein the first DHCP option comprises a first plurality of DHCP options.

4. The non-transitory computer-readable medium of claim 3, wherein the second DHCP option comprises a second plurality of DHCP options, the second plurality of DHCP options including non-requested options with respect to the first plurality of DHCP options.

5. The non-transitory computer-readable medium of claim 1, the operations further comprising performing a bidirectional authentication with the authentication server.

6. The non-transitory computer-readable medium of claim 1, wherein the request for the first DHCP option is sent via extensible authentication protocol (EAP) through a first hop networking device.

7. The non-transitory computer-readable medium of claim 1, wherein the request for the first DHCP option is sent directly to the authentication server via enrollment over secure transport (EST).

8. The non-transitory computer-readable medium of claim 7, wherein the request for the first DHCP option is sent directly to the authentication server via EST to reauthenticate the client device.

9. The non-transitory computer-readable medium of claim 1, wherein the request comprises a serialized DHCP version 6 (DHCPv6) YANG model.

10. A method comprising:
at an authentication server, receiving, from a client device, a request for a first dynamic host configuration protocol (DHCP) option;
determining if the authentication server implements DHCP;
based at least in part on a determination that the authentication server does not implement a DHCP, transmitting an application program interface (API) call to a DHCP server associated with the authentication server acting as a DHCP gateway, a representational state transfer (REST) wrapper being applied to the API call such that the first DHCP option is secured;
receiving a response from the DHCP server; and based at least in part on the authentication server does implement DHCP protocol, transmitting to the client device a response from the authentication server; transmitting the response received from the DHCP server to the client device, wherein the response received from the DHCP server comprises: the first DHCP option; and a second DHCP option separated from the first DHCP option, the second DHCP option being a non-requested option with respect to the first DHCP option and comprising a pointer to the authentication server.

11. The method of claim 10, further comprising:
based at least in part on the authentication server does implement DHCP protocol, transmitting to the client device a response from the authentication server.

12. The method of claim 10, wherein:
the first DHCP option comprises a first plurality of DHCP options, and
the second DHCP option comprises a second plurality of DHCP options, the second plurality of DHCP options including non-requested options with respect to the first plurality of DHCP options.

13. The method of claim 10, wherein the request for the first DHCP option is sent via extensible authentication protocol (EAP) through a first hop networking device.

14. The method of claim 10, wherein the request for the first DHCP option is sent directly to the authentication server via enrollment over secure transport (EST).

15. The method of claim 14, wherein the request for the first DHCP option is sent directly to the authentication server via EST to reauthenticate the client device.

16. The method of claim 10, wherein the request comprises a serialized DHCP version 6 (DHCPv6) YANG model.

17. An authentication server comprising:
a processor; and
a non-transitory computer-readable media storing instructions that, when executed by the processor, causes the processor to perform operations comprising:
receiving, from a client device, a request for a first dynamic host configuration protocol (DHCP) option;
determining if the authentication server implements DHCP;
based at least in part on the authentication server does not implement a DHCP protocol:
transmitting an application program interface (API) call to a DHCP server associated with the authentication server acting as a DHCP gateway, a representational state transfer (REST) wrapper being applied to the API call such that the first DHCP option is secured; and
receiving a response from the DHCP server; and based at least in part on the authentication server does implement DHCP protocol, transmitting to the client device a response from the authentication server; transmitting the response received from the DHCP server to the client device, wherein the response received from the DHCP server comprises: the first DHCP option; and a second DHCP option separated from the first DHCP option, the second DHCP option being a non-requested option with respect to the first DHCP option and comprising a pointer to the authentication server.

18. The authentication server of claim 17, wherein the request for the first DHCP option is sent via extensible authentication protocol (EAP) through a first hop networking device.

19. The authentication server of claim 17, wherein the request for the first DHCP option is sent directly to the authentication server via enrollment over secure transport (EST).

20. The authentication server of claim 17, wherein the request for the first DHCP option is sent directly to the authentication server via EST to reauthenticate the client device.

* * * * *